Patented Aug. 6, 1929.

1,723,800

UNITED STATES PATENT OFFICE.

WILHELM MICHAEL, OF OPPAU, AND ALBERT PALM, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

UTILIZATION OF SULPHITE CELLULOSE WASTE LIQUOR.

No Drawing. Application filed March 16, 1928, Serial No. 262,328, and in Germany March 21, 1927.

The method of producing cellulose by treating wood or other fibrous materials with solutions of sulfurous acid which is not completely neutralized with ammonia, is known to deliver excellent yields of a pulp of particularly high quality. But this method is attended with the same drawbacks as are other sulphite processes, namely by the difficulty of removing or utilizing the waste liquors, which contain the whole of the lignine matter, amounting to about one half of the initial wood material.

We have found that the waste liquors resulting from the production of sulphite cellulose by means of solutions of sulfurous acid which is not completely neutralized with ammonia, can be utilized and regenerated in a most favorable way, whereby, simultaneously, valuable by-products are obtained. The essential feature of the present invention consists in heating the waste liquor at a high pressure, separating the coally material produced, recovering ammonia, if desired, or regenerating the solution by adding sulfur dioxid, after sulfuric acid and oxalic acid have been removed if so desired, whereupon the ammonium salts, such as the formate, acetate and the like can be instantly recovered from the solution or as soon as the content of the said salts in the solutions has been raised by reusing the solution for several pulping operations and treating it in the manner described above after each cooking operation. Thus, after each operation, the lignine matter dissolved in the waste liquor is decomposed to carbon, acetic, formic and oxalic acid and the like, and the filtered solution is regenerated for reuse by adding sulfur dioxid. The said carbon is obtained in a very finely dispersed state and is highly active, which properties allow of using it either as active carbon in purifying or catalytic or other chemical processes or as a fuel or coloring matter. The decomposition of the lignine matter is performed by heating the waste liquor to temperatures above 180° C. in a pressure tight vessel. The acid liquid can be neutralized with ammonia prior to heating, additional quantities of ammonia being thus provided in order to neutralize the acids which are formed during the said decomposition. Depending on the nature and the content of lignine matter present in the waste lye, heating is maintained for several hours and in most cases to about 240° C. If the decomposition of the lignine matter is to be performed in a short length of time, heating of the neutralized liquor to temperatures of at least 230° C. is necessary whereby pressures of 50 atmospheres and more are attained, so that a reaction vessel of special and costly material is required. We have found that the same effect is obtained at much lower temperatures than 250° C. by adding charcoal or similar active material, such as the carbon obtained in a previous operation of the present process, to the waste liquor. When employing such catalytic additions, a temperature of only 200° C. or even less is required and in consequence thereof the pressure in the reaction vessel rises only to about 25 atmospheres, so that a reaction vessel of a simpler and cheaper material can be used and the same is only slightly attacked even by a very extended use. The heating operation can be further simplified by not completely neutralizing the waste lye or by dispensing with the neutralization, after blowing off free sulfurous acid before heating, whereby the required temperature is lowered to between only 180° and 200° C. and, when employing an addition of catalytic matter, to between 160° and 180° C., or the time of heating can be reduced. After separating the carbon by filtration, the filtrate, after adding sulfur dioxid, can be directly employed again for producing cellulose, but it is more preferable, prior to introducing sulfurous acid, to remove the sulfuric acid formed during the heating process by precipitating it by means of a base, such as slaked lime, in order to avoid the injurious effect of sulfuric acid in the sulphite cooking liquor, oxalic acid being simultaneously precipitated. If lime be chosen as precipitating agent, the quantity employed should be carefully determined with respect to the quantities of the said two acids present in the solution, so that no superfluous quantities are added, which, on introducing sulfurous acid, would lead to the formation of acid calcium sulphite, the presence of which in the cooking liquor would reduce the output and quality of the cellulose obtained. By filtering off the precipitate a residue consisting of gypsum and calcium oxalate is obtained, from which oxalic acid can be obtained in any known manner, such as by means of sulfuric acid.

When working in the manner described above and reusing and regenerating the waste liquor for several times, the content of the waste lye in ammonium salts of organic acids, and especially of acetic acid, is increased to such an extent, that the said acids can be easily recovered. The recovery of the said salts can be performed, for example, by evaporating the water so far as to allow a crystallization of the said ammonium salts, or slaked lime can be added, and, after recovery of the ammonia expelled thereby, and evaporation, the residue can be subjected to dry distillation in order to produce ketones, such as acetone and the like. If it be desired to produce ammonium sulfate, sulfuric acid is added, whereupon the organic acids set free can be obtained by distillation or any other suitable method. In each of these variations the ammonia employed is recovered.

The sulfur dioxid, still contained in the cooking liquor after each pulping operation, is preferably blown off and is reused in a following operation for producing fresh cooking liquor. The process described above allows not only of avoiding the difficulties of utilizing or removing the sulphite waste liquor, but considerable quantities of valuable by-products are produced.

The nature of this invention is further illustrated by the following examples to which, however, the invention is not limited.

Example 1.

100 kilograms of chipped air-dry fir wood are heated in a closed boiler with 550 kilograms of a solution of 20 kilograms of sulfur dioxid and 3.5 kilograms of ammonia for about 24 hours and at a temperature of about from 100° to 120° C. The remainders of free sulfur dioxid are then blown off and introduced into fresh cooking liquor. The resulting pale pulp is separated in an amount of about 48 kilograms (when in the dry state) and washed with water which washing solutions can be employed for preparing fresh cooking liquor.

The waste lye is neutralized to weak alkalinity by means of ammonia, heated for about 10 hours to from 240° to 250° C. and is separated, by filtration, from the carbon, which has been formed during the decomposition in an amount of 15 to 20 kilograms. But it is more preferable to add about 20 to 30 kilograms of the carbon obtained by a previous operation, to the waste liquor after the addition of ammonia and then to heat it in a pressure tight vessel, while stirring, for about 10 hours to only 200° C.

After filtering off the carbon, the amount of slaked lime corresponding to the amount of sulfuric and oxalic acid present in the filtrate is added, the mixture filtered again, whereupon sulfur dioxid is introduced into the filtrate until its specific gravity has been raised for about 0.04. The resulting solution can now be employed as cooking liquor for another 100 kilograms of wood. If a pale pulp is to be produced with this cooking liquor, care should be taken to raise the temperature in cooking not above 115° C., the period of working being therefore extended for some hours more. The waste liquor is regenerated and reused as often as it allows of producing a good pulp. The waste liquor of the last batch is treated with slaked lime whereby ammonia is recovered; the calcium salts obtained are worked up for the production of acetic acid or acetone, as desired.

Example 2.

100 kilograms of chipped air-dry fir wood are treated at about 115° C. for 25 hours with about 550 kilograms of a solution of 20 kilograms of sulfurous acid and 2.2 kilograms of ammonia in about 530 kilograms of water. After blowing off free sulfurous acid the liquor is drawn off and is heated in a pressure tight vessel to 200° C. for 1 hour, whereby 24.9 kilograms of carbon with a content of ashes of 1.7 per cent of its weight are precipitated, which are filtered off. The slightly yellow filtrate which contains 2.5 kilograms of volatile organic acids (determined as acetic acid) is stirred with 7 kilograms of pulverized calcium carbonate. After filtering off the precipitate of gypsum and calcium salts of organic compounds, sulfurous acid is introduced into the filtrate and the resulting solution is employed for treating a further 100 kilograms of wood. The waste liquor of this operation is treated as described above and can be employed for a third pulping operation, whereupon ammonia is recovered from the resulting waste liquor, for example, by distilling the solution, after adding slaked lime, at about 150° C. and at a pressure above atmospheric pressure.

What we claim is:

1. In the process of producing cellulose by means of sulfurous acid and ammonia, the utilization of the sulphite cellulose waste liquor, which consists in expelling free sulfurous acid, heating the liquor in a closed vessel to a temperature above 150° C., filtering off carbon and expelling ammonia by means of a base stronger than ammonia.

2. In the process of producing cellulose by means of sulfurous acid and ammonia, the utilization of the sulphite cellulose waste liquor, which consists in expelling free sulfurous acid, heating the liquor in a closed vessel to a temperature above 150° C., in the presence of a catalytic material accelerating the decomposition of the organic substances present in the waste liquor, filtering off carbon and expelling ammonia by means of a base stronger than ammonia.

3. In the process of producing cellulose by means of sulfurous acid and ammonia, the utilization of the sulphite cellulose waste liquor, which consists in expelling free sulfurous acid, heating the liquor in a closed vessel to a temperature above 150° C., filtering off carbon and reusing the liquor in a following pulping operation after introducing sulfurous acid.

4. In the process of producing cellulose by means of sulfurous acid and ammonia, the utilization of the sulphite cellulose waste liquor, which consists in expelling free sulfurous acid, heating the liquor in a closed vessel to a temperature above 150° C., filtering off carbon, precipitating sulfuric and oxalic acid and, after filtration, reusing the liquor in a following pulping operation after introducing sulfurous acid.

5. In the process of producing cellulose by means of sulfurous acid and ammonia, the utilization of the sulphite cellulose waste liquor, which consists in blowing off free sulfurous acid, adding ammonia, heating the liquor in a closed vessel to a temperature above 180° C., filtering off carbon and reusing the liquor in a following pulping operation after introducing sulfurous acid.

6. In the process of producing cellulose by means of sulfurous acid and ammonia, the utilization of the sulphite cellulose waste liquor, which consists in blowing off free sulfurous acid, adding ammonia, heating the liquor in a closed vessel to a temperature above 180° C., filtering off carbon, precipitating sulfuric and oxalic acid and, after filtration, reusing the liquor in a following pulping operation after introducing sulfurous acid.

7. In the process of producing cellulose by means of sulfurous acid and ammonia, the utilization of the sulphite cellulose waste liquor, which consists in blowing off free sulfurous acid, adding a catalytic material accelerating the decomposition of the organic substances in the subsequent heating of the liquor in a closed vessel to a temperature above 150° C., filtering off carbon after such heating, and reusing the liquor in a following pulping operation after introducing sulfurous acid.

8. In the process of producing cellulose by means of sulfurous acid and ammonia, the utilization of the sulphite cellulose waste liquor, which consists in blowing off free sulfurous acid, adding ammonia and a catalytic material, accelerating the decomposition of the organic substances in the subsequent heating of the liquor in a closed vessel to a temperature above 150° C., filtering off carbon after such heating, and reusing the liquor in a following pulping operation after introducing sulfurous acid.

9. In the process of producing cellulose by means of sulfurous acid and ammonia, the utilization of the sulphite cellulose waste liquor, which consists in blowing off free sulfurous acid, adding porous coal, heating the liquor in a closed vessel to a temperature above 150° C., filtering off carbon and reusing the liquor in a following pulping operation after introducing sulfurous acid.

10. In the process of producing cellulose by means of sulfurous acid and ammonia, the utilization of the sulphite cellulose waste liquor, which consists in blowing off free sulfurous acid, heating the liquor in a closed vessel to a temperature above 180° C., filtering off carbon, precipitating sulfuric and oxalic acid and, after filtration, reusing the liquor in a following pulping operation after introducing sulfurous acid whereupon, after repeating these operations, ammonium salts of organic acids are recovered from the filtrated liquor finally obtained.

In testimony whereof we have hereunto set our hands.

WILHELM HICHAEL.
ALBERT PALM.